Oct. 4, 1932.   R. W. DAVIS   1,880,861
SPRING
Filed Oct. 24, 1929
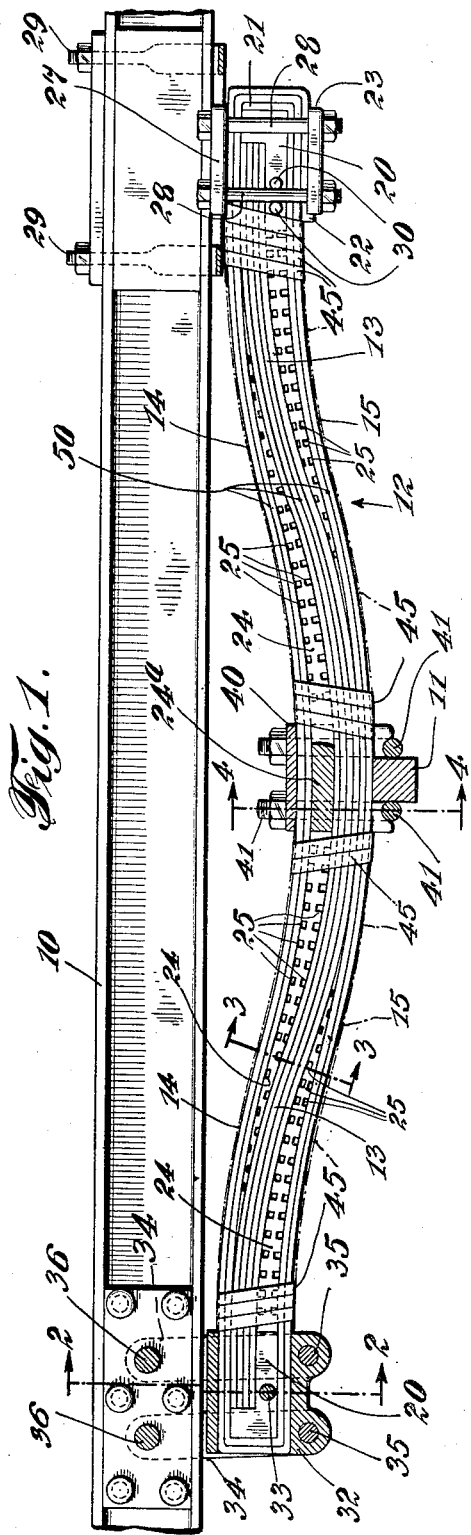
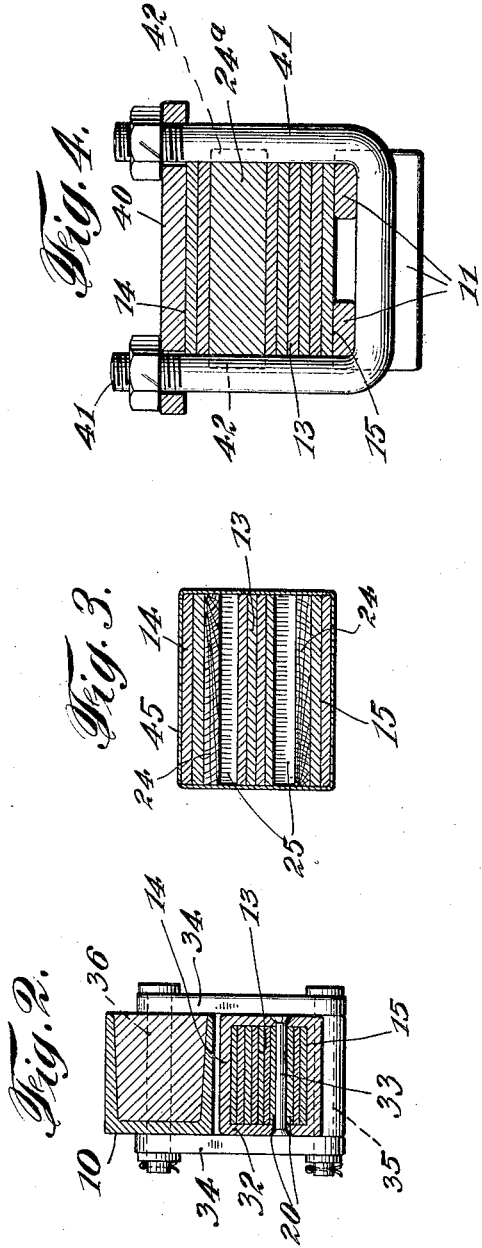
Robert W. Davis INVENTOR
BY Frank J. Kent ATTORNEY Patented Oct. 4, 1932

1,880,861

UNITED STATES PATENT OFFICE

ROBERT W. DAVIS, OF OZONE PARK, NEW YORK

SPRING

Application filed October 24, 1929. Serial No. 402,071.

My invention relates to springs especially designed and useful for motor vehicle chassis support, although not necessarily limited to such uses. The nature and advantages of the invention will be sufficiently understood from the present description of a preferred form as adapted for use in a motor vehicle chassis.

A principal object is to provide a unitary-stress spring; that is, one in which each member is subjected to only a single stress— either tension or compression—as distinguished from ordinary leaf springs in which each blade in bending is subjected to both compression and tension stresses, occurring respectively in the opposite surface layers.

Another object is to arrange the total amount of spring material so that practically all of it is equally active in the flexible support of the vehicle frame (or analogous body) in relation to the axle (or analogous element), with avoidance of a large mass of relatively inactive spring material, representing practically unsprung weight on the axle. Another object is to so arrange the spring elements that the individual leaves may be thin in comparison with standard practice, avoiding the relatively severe stresses in thick spring leaves due to the tension stress in one surface layer and compression stress in the opposite surface layer of such thick leaves. In the thin leaf, the difference between fiber stresses at opposite faces of the thin leaf is materially reduced, and practically negligible. A further object is to equalize the stresses and flexure throughout the length of the spring, thus avoiding localized stresses which produce breakage in ordinary leaf springs and improving the resilient support of the frame.

These and other objects are realized by composing the spring of distinct compression and tension members each of which may consist of a plurality of elements or leaves of thin section. Preferably, the spring is arranged as an approximately "flat" or semi-elliptic spring, supported at the longitudinal center and in turn supporting the load at its ends. The compression members, extending in each direction from the center are located between two tension members and in general diagonal relation thereto, and all the members are positively anchored at the center and the ends. By this arrangement, the compression member acts by a diagonal or triangulated component of forces substantially as a flexible compression beam, in cooperation with the tension members. Both the compression and tension members in each direction from the center are uniformly reversely curved in such manner that the total length of each leaf in each member is the same, thus providing absolutely uniform stresses, uniform elongation and resilient action through the length of the spring, and avoiding localized stresses which usually occur in ordinary leaf springs in each leaf at the end of the next lower leaf, as evidenced by the fact that breakage almost invariably occurs at this point. The ends of the spring are definitely anchored and guided to move in alignment with each other, without vertical tilting or canting of the ends. This arrangement in combination with the double or reverse curvature insures uniform deflection (or straightening) throughout the range of deflection, uniform stresses, etc., as referred to above and hereafter. By properly arranging the spring material according to present principles, the leaves may be thin, so that none of them needs to be hot-forged or set, but may be formed or bent to proper positions while cold, the natural form of all the elements being flat or straight. The principles disclosed also enable production of a spring of unitary stress type in which the lines of compression force may make a very acute angle to the lines of tension force; or in other words, the spring may be of relatively straight or flat form and of moderate vertical depth at all points.

The characteristics and advantages of the invention are further sufficiently explained in connection with the following detail description of the drawing, which shows an exemplifying embodiment. After considering this example, skilled persons will understand that many variations may be made without departing from the principles disclosed, and I contemplate the employment of any structures that are properly within the scope of the appended claims.

Fig. 1 is a side elevation of a spring structure embodying the invention in one form, with some parts broken away or in section.
Fig. 2 is a section at 2—2, Fig. 1.
Fig. 3 is a section at 3—3, Fig. 1.
Fig. 4 is a section at 4—4, Fig. 1.

The vehicle side frame member 10 of channel section represents the load, or supported body. The axle 11 represents the support or point of force application. The spring 12 is preferably of approximately flat or semi-elliptical form, supported at its center and supporting the load at its ends. It consists principally of a central compression member 13 and upper and lower tension members 14 and 15, each of which may and preferably does include a plurality of leaves or elements; thus, as shown, the compression member consists of four thin leaves and each tension member consists of two thin leaves. In each direction from the axle the compression member extends between the tension members in a generally diagonal upward direction, representing practically the diagonal of a parallelogram of which the tension members 14 and 15 are the upper and lower lines. The ends of the compression and tension members are positively and relatively immovably clamped. The ends of the compression leaves 13 abut against the vertical shoulder of a supporting or clamping block 20. The tension members 14 and 15 might consist of distinct or separate leaves, but for convenience in assembly and simplification of the anchoring of the ends of these members, in the preferred form they are desirably composed of a single strip of thin metal which is formed or wound longitudinally about the compression member and clamping blocks. Thus, as shown, this strip commences at 21 along an end face of one of the blocks 20, and is laid twice alongside the compression member and about the clamping blocks, producing the two leaves of each tension member, and terminating in a hooked end 22 which is secured against the inward edge of a lower clamping plate 23.

Filler blocks or spacers 24 are placed between the tension and compression members to fill the spaces left by their relatively diagonal arrangement. These spacers may be of wood or other suitable material, and are transversely slotted or notched in their upper and lower faces as at 25, to insure flexible action, these notches producing in effect practically distinct spacer blocks properly connected or located throughout the length of the spring space to maintain the spacing of the compression and tension members in cooperation with other elements, especially the binding tape referred to later. The spacers are of generally tapered form corresponding to the generally elongated triangular form of the spring spaces in the longitudinal vertical plane.

One end of the spring (at the right in Fig. 1) is clamped between the lower plate 23 and an upper plate 27, by bolts 28; and plate 27 is clamped to the frame member 10 by U-bolts 29. This end of the spring (and its individual leaves) is thus held in fixed relation to the frame. Movement of the clamping or abutment block 20 in relation to the clamp is prevented by pins 30 in opposite faces of the block engaged at opposite sides of two of the bolts 28. The other end of the spring is fixedly held in a box 32, movement of the clamping or abutment block 20 at that end in the box being prevented by a pin 33 passing through the block and engaging in the box sides. The box is supported for straight line motion in relation to the spring length, that is for practically straight longitudinal movement in relation to the frame, by parallel links 34, two at each side of the frame, pivotally connected to the box at 35 and to the frame at 36. This represents any suitable means for guiding the end of the spring for straight line movement without tilting in the vertical plane. The center portion of the spring is secured to the axle by clamping means including a top plate 40 and U-bolts 41. The upper spacer 24 is continuous for the two end portions of the spring, the central portion 24a being clamped between the compression member 13 and the upper tension member 14, and longitudinal movement is prevented by side notches 42 engaging the U-bolts.

The individual elements of the spring may all be naturally straight or flat and the complete spring is held in reversely curved form as shown by binding tapes 45 which may be of suitable metal such as phosphor-bronze and anchored at one end in the center clamp and wound about the spring and anchored at the other ends in the end clamps. The act of binding the spring with the tape holds the tension and compression members in contact with the spacer strips and forms the spring normally in reverse-curved shape, as shown. The spring is thus initially formed or set in the desired shape without necessity for hot pressing or forging.

The entire spring may be described as consisting of halves, each extending from the axle to an end; in each half the two quarters, extending from the axle to a center point 50, and from such point to an end, have corresponding individual leaf elements of equal and opposite curvature; thus the arc of curvature of the portion of each tension member from the axle to a center point 50 is struck from the same center above the spring, and the arc of the portions from the point 50 to the end is struck from a center located at the same distance below the spring;

and the same with regard to the compression member. In other words, each element of each member of the spring has the same total effective length.

In operation, when the axle moves toward the frame, the spring in its entirety is deflected by straightening and accompanying elongation, this straightening or flattening being uniform throughout the length of the spring due to the uniform length of the individual leaves in each member. Deflection is resisted principally by endwise compression of the compression members 13 due to their angular relation to the tension members. As otherwise expressed, the compression member tends to elongate by straightening and this tendency is resisted by the tension members anchored at the center and at the ends, so that the tension members are stretched while the compression members are compressed. It is therefore evident that the spring acts mainly by longitudinal tension and compression with practically no transverse bending strains internally in the leaves. Uniformity of deflection (or straightening) is secured by the form of the members and by the definite support and guiding of the spring ends relatively in a linear direction so that both the outer and inner portions of all the members are compelled to bend or straighten uniformly, and the stresses at every point throughout the spring at any given moment and with a given load are uniform and equal.

There is no relative slippage of the spring elements at the ends or at the center. There is slight maximum slippage at the center of each spring portion between the axle and the ends, that is at the points 50, this slippage occurring between the individual leaves and between leaf and spacer surfaces, and decreasing progressively from the center points 50 toward the axle and ends. Proper lubrication may be provided by treating the spacers and leaves with oil or graphite, or by injecting suitable lubricant within the binding tape or otherwise, the specific lubricating means or arrangement not forming a part of this invention. Preferably, there are no pins, bolts or fastening devices inserted through the leaves at any point.

It will now be understood that, as explained in one way, the spring is a flexible beam in which the total spring material is disposed most advantageously, that is in the form of upper and lower tension cords and central diagonal compression members in such angular relation to the tension cords as to produce the above stated uniform deflection and resilient action, with omission of superfluous or idle material, as represented by the spaces filled by the spacer strips, which are not active spring material but are preferably a much lighter material such as wood. This is in distinction from multi-leaf springs of ordinary type, in which the leaves are of progressively increasing lengths upward from the lower leaf, and are relatively thick, and the spring action is obtained principally by the resistance of the individual leaves to transverse bending; so that although uniform deflection is attempted by the progressive lengthening of the leaves, or upward step-formation, this uniform action is not really attained, since the deflection of each leaf is localized largely at a point directly above the end of the next lower leaf, and breakage usually occurs at these points. As otherwise stated, the thick leaves act practically as flexible solid beams of substantial depth; the upper portion of each is a tension member and the lower portion is a compression member, and in bending the outer fiber stresses are very heavy, and these stresses moreover vary from the center to the end of the leaf and are also localized largely at a point above the end of the next lower leaf, as above stated. Such forces and fiber stresses are practically entirely avoided in the present thin leaves, which act by longitudinal compression and tension. There is no localization of bending strains, but on the contrary deflection and stresses are uniform and equal throughout the length of the spring for each member with any given load or degree of deflection.

I claim:

1. A multi-leaf spring supported at its ends and center, upper and lower leaves being arranged as spaced tension members, and intermediate leaves being arranged as a compression member, the compression member extending generally diagonally between the tension members from the center to each end.

2. A multi-leaf spring supported at its ends and center, upper and lower leaves being arranged as spaced tension members, and intermediate leaves being arranged as a compression member, the compression member extending generally diagonally between the tension members from the center to each end, the tension and compression leaves at each end being fixedly secured in relation to each other.

3. A multi-leaf spring supported at its ends and center, upper and lower leaves being arranged as spaced tension members, and intermediate leaves being arranged as a compression member, the compression member extending generally diagonally between the tension members from the center to each end, the tension and compression leaves at each end being fixedly secured in relation to each other, and one end of the spring being supported and guided to move in a substantially straight longitudinal direction in alignment with the other end of the spring.

4. A multi-leaf spring supported at its ends and center, upper and lower leaves being arranged as spaced tension members, and intermediate leaves being arranged as a compression member, the compression member extending generally diagonally between the tension members from the center to each end and tapered spacers in the spaces between the tension and compression members.

5. A multi-leaf spring supported at its ends and center, upper and lower leaves being arranged as spaced tension members, and intermediate leaves being arranged as a compression member, the compression member extending generally diagonally between the tension members from the center to each end and tapered spacers in the spaces between the tension and compression members, the spacers being transversely channeled to increase flexibility.

6. A multi-leaf spring supported at its ends and center, upper and lower leaves being arranged as spaced tension members, and intermediate leaves being arranged as a compression member, the compression member extending generally diagonally between the tension members from the center to each end and tapered spacers in the spaces between the tension and compression members, and a binding strip wound about the spring and securing its members together throughout their lengths.

7. A multi-leaf spring supported at its ends and center, upper and lower leaves being arranged as spaced tension members, and intermediate leaves being arranged as a compression member, the compression member extending generally diagonally between the tension members from the center to each end, all of the spring elements in each direction from the center being reversely curved whereby the leaves in corresponding parts are of equal lengths and deflection and strains are uniform throughout the spring and throughout its deflection range.

8. A multi-leaf spring supported at its ends and center, upper and lower leaves being arranged as spaced tension members, and intermediate leaves being arranged as a compression member, the compression member extending generally diagonally between the tension members from the center to each end, the leaves being of relatively thin section and substantially free from transverse bending strain.

9. A spring comprising substantially parallel upper and lower tension members, each consisting of a plurality of leaves, and an intermediate compression member consisting of a plurality of leaves, the compression member extending in each direction from the center generally diagonally upward to the ends.

10. A spring comprising substantially parallel upper and lower tension members, each consisting of a plurality of leaves, and an intermediate compression member consisting of a plurality of leaves, the compression member extending in each direction from the center generally diagonally upward to the ends, the compression and tension members being uniformly reversely curved in each direction from the center.

11. A spring comprising substantially parallel upper and lower tension members, each consisting of a plurality of leaves, and an intermediate compression member consisting of a plurality of leaves, the compression member extending in each direction from the center generally diagonally upward to the ends, the spaces between the tension and compression members being filled by longitudinally tapered flexible spacers.

12. A spring comprising substantially parallel upper and lower tension members, each consisting of a plurality of leaves, and an intermediate compression member consisting of a plurality of leaves, the compression member extending in each direction from the center generally diagonally upward to the ends, the spring members being fixedly clamped together at the ends and at the center.

13. A spring comprising substantially parallel upper and lower tension members, each consisting of a plurality of leaves, and an intermediate compression member consisting of a plurality of leaves, the compression member extending in each direction from the center generally diagonally upward to the ends, one end of the spring as a unit being mounted and guided for substantially straight line movement in relation to the other end to secure uniform flexure throughout the spring length.

14. A spring comprising substantially parallel upper and lower tension members, each consisting of a plurality of leaves, and an intermediate compression member consisting of a plurality of leaves, the compression member extending in each direction from the center generally diagonally upward to the ends, the tension members consisting of a single strip wound about the compression member.

15. A spring comprising substantially parallel upper and lower tension members, each consisting of a plurality of leaves, and an intermediate compression member consisting of a plurality of leaves, the compression member extending in each direction from the center generally diagonally upward to the ends, clamping means for the ends of the spring, and abutment blocks in the clamping means in abutting relation to the ends of the compression member.

16. A spring comprising substantially parallel upper and lower tension members, each consisting of a plurality of leaves, and an intermediate compression member consisting of a plurality of leaves, the compression member extending in each direction from the center generally diagonally upward to the ends, clamping means for the ends of the spring, and abutment blocks in the clamping means in abutting relation to the ends of the compression member, the tension members consisting of a single strip wound about the compression member and abutment blocks.

17. A spring comprising substantially parallel upper and lower tension members, each consisting of a plurality of leaves, and an intermediate compression member consisting of a plurality of leaves, the compression member extending in each direction from the center generally diagonally upward to the ends, clamping means for the ends of the spring, and abutment blocks in the clamping means in abutting relation to the ends of the compression member, one of the spring end clamps being fixedly secured to a frame member and the other being movably secured to the frame member for movement in line with the fixedly secured end.

18. A spring comprising substantially parallel upper and lower tension members, each consisting of a plurality of leaves, and an intermediate compression member consisting of a plurality of leaves, the compression member extending in each direction from the center generally diagonally upward to the ends, the spaces between the tension and compression members being filled by longitudinally tapered flexible spacers, and a binding tape wound about the spring and maintaining the spring members and spacers in contact.

19. A spring comprising substantially parallel upper and lower tension members, each consisting of a plurality of leaves, and an intermediate compression member consisting of a plurality of leaves, the compression member extending in each direction from the center generally diagonally upward to the ends, the spaces between the tension and compression members being filled by longitudinally tapered flexible spacers, and a binding tape wound about the spring and maintaining the spring members in reverse-curved form in each direction from the center.

In testimony whereof I affix my signature.

ROBERT W. DAVIS.